May 18, 1971 J. H. CRAWFORD 3,579,405
MACHINE FOR INTERCONNECTING VENEER PANELS
Filed April 9, 1968 4 Sheets-Sheet 1

INVENTOR.
JOHN H. CRAWFORD
BY

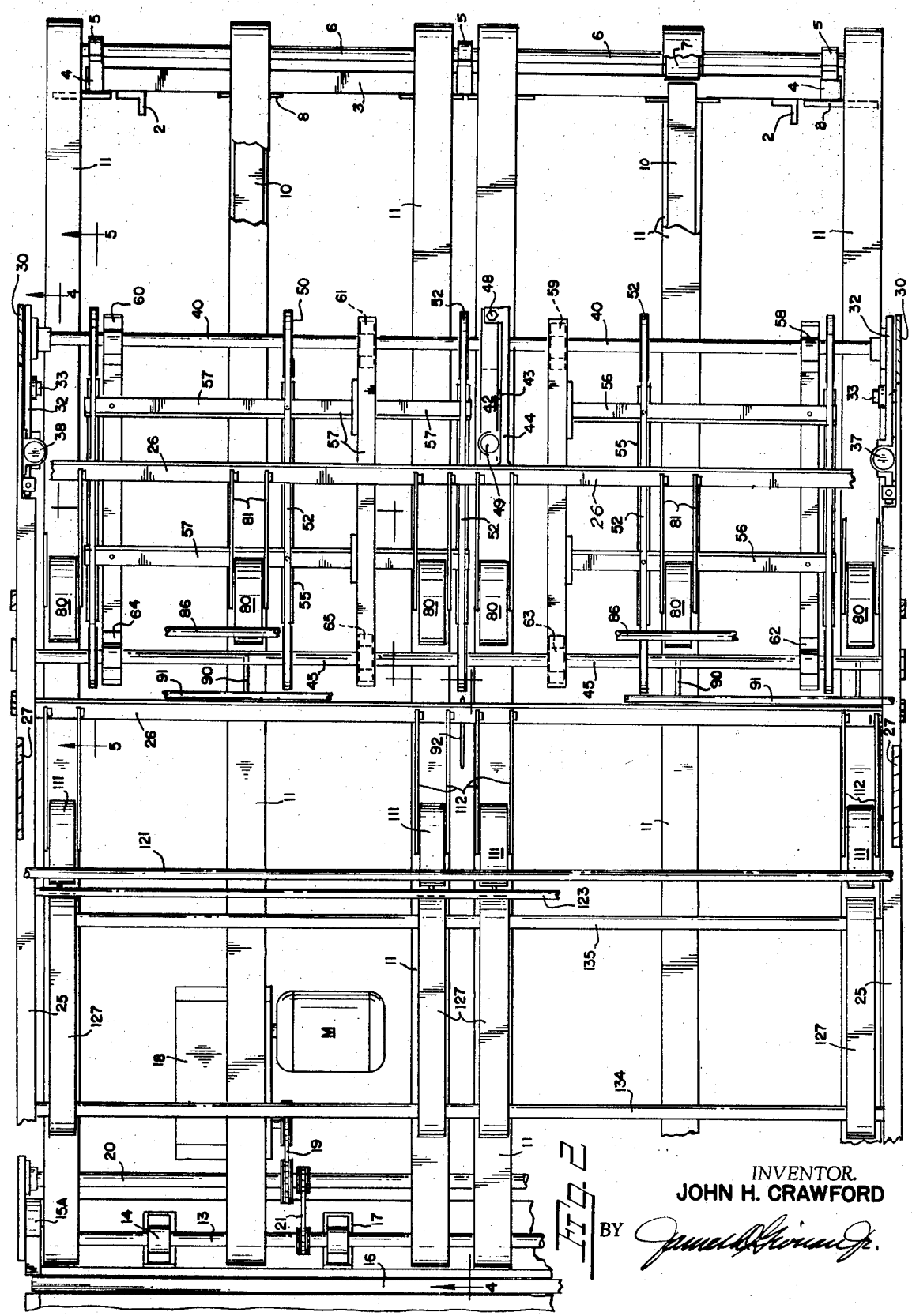

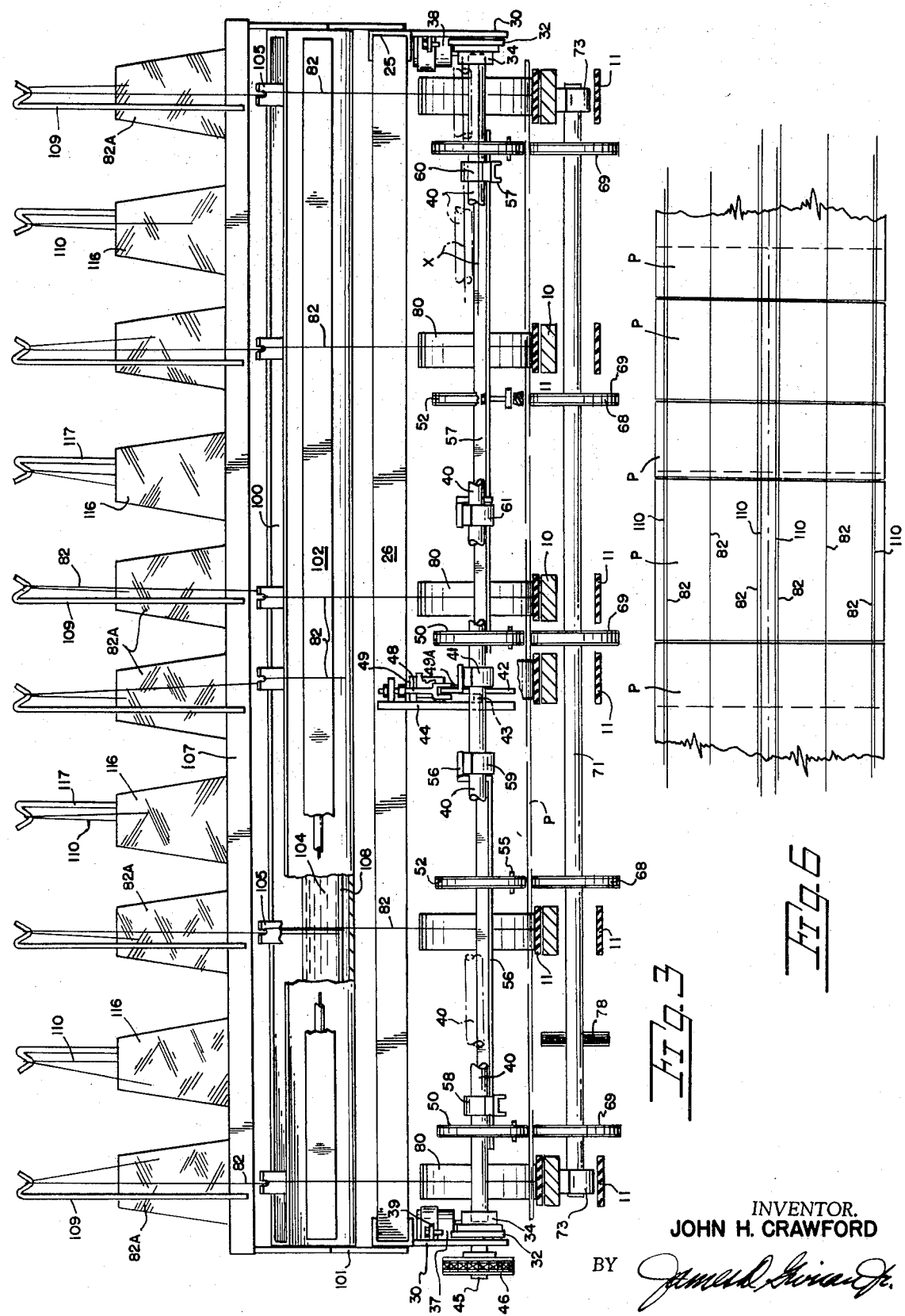

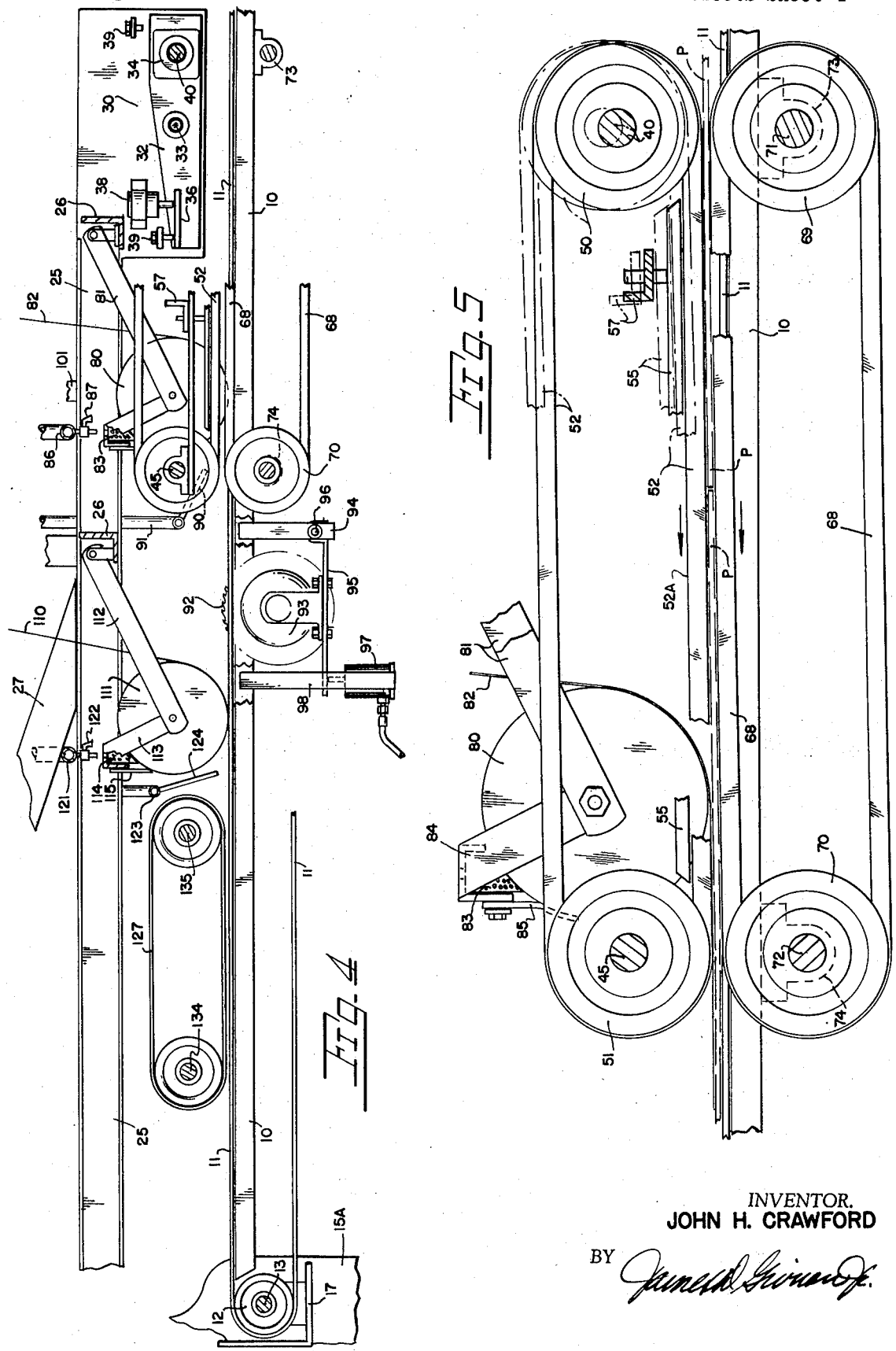

United States Patent Office 3,579,405
Patented May 18, 1971

---

3,579,405
MACHINE FOR INTERCONNECTING VENEER PANELS
John H. Crawford, Corvallis, Oreg., assignor to Leading Plywood, Corvallis, Oreg.
Filed Apr. 9, 1968, Ser. No. 719,972
Int. Cl. B32b 31/12, 31/10
U.S. Cl. 156—546          8 Claims

ABSTRACT OF THE DISCLOSURE

A machine for the application of continuous elements to a series of abutting veneer panels to interconnect contiguous panels for use in an article of manufacture. Means are disclosed for both conveying and positioning each of the panels into side-by-side relationship with an adjacent panel subsequent to which the continuous element is applied. Such means includes continuous belts disposed above and below the panels. The continuous elements disclosed is glue bearing and applied by wheels in rolling contact with the panels. For drying the glue bearing elements on said panels a directed air flow is provided.

BACKGROUND OF THE INVENTION

The present invention relates to machines for handling flexible sheet or panel material and more particularly to a machine for positioning veneer panels into contiguous relationship with other panels and applying a flexible and continuous element thereto to interconnect the same. The interconnected panels may be later utilized as plywood cores.

The prior art I am aware of for the most part includes machines for applying glue to the abutting edges of adjacent panels of veneer such being referred to in the art as edge gluing machines. Such machines do not lend themselves in a practical manner to the function performed by the present invention. Ideally, panels of veneer for conventional lay-up into a finished plywood panel are of a large enough area, for example four by eight feet, so as to avoid costly joining two or more smaller panels into one-piece core stock of such a size. For the manufacture of such multi-panel one-piece core stock it has heretofore been necessary to perform a time-consuming edge gluing or other costly joining operation.

In contrast, the present machine is capable of joining veneer panels usually of small size lower grade or, heretofore in some cases, waste veneer, into a one-piece core stock which stock may be immediately laid up into a plywood panel in the same manner as a premium grade one-piece panel. The present machine achieves the joining of the small size, lower grade veneer panels in a continuous running, fast operation and discharges the core material for cutting as desired prior to the lay-up line without stacking same for drying as is required of edge glued panels.

A further advantage of the present machine is the capability for bringing each panel into abutting edge contact with an adjacent panel which when interconnected constitute a one-piece core comparable with a high grade, costly one-piece veneer core. The abutting disposition of the interconnected panels is retained by a continuous element applied to the several joined veneer panels.

It is a further advantage or object of the present machine to join several moving panels of veneer to form a one-piece core material which may be easily cut to a desired size for lay-up into the particular size of plywood sheet being fabricated. Accordingly, and if desired, saw means may be centrally located of the machine to cut the one-piece core formed into continuous four foot widths which are later clipped to a desired length dimension. A clipper for the last mentioned operation may be conveniently combined with the present machine.

A still further object is the overcoming of problems occurring from broken or split veneer panels. The continuous element applied to each panel serves to hold any broken or split panel together to prevent overriding or further separation of the panel's split edges. First and second series of wheels are spaced in the direction of travel of the veneer panels to apply the continuous elements at horizontally spaced apart points on a panel or panels to further insure retention of a separate panel or joined panels against such overriding even when segments of the continuous elements applied by the first series of wheels have dried glue thereon as can occur after momentary machine stoppage.

SUMMARY

The present invention comprehends machine structure for applying continuous elements adhesively to a series of individual panels to interconnect the panels. Such structure applies said elements bearing an adhesive to provide an immediate bond with the individual panels which have been previously positioned into edge abutting relationship. Further, the present invention combines the foregoing structure with means for accurately positioning the veneer panels in said relationship. First and second series of wheels apply continuous glue bearing elements at horizontally spaced apart locations to the panels, spaced in the direction of their travel, with the wheel means including moisture applicators to reduce adhesion between each wheel and its associated continuous element.

DRAWING DESCRIPTION

With reference to the accompanying drawings forming a part of the disclosure:

FIG. 2 is a sectional, plan view of FIG. 1 taken along line 2—2 of FIG. 1,

Figure 1:
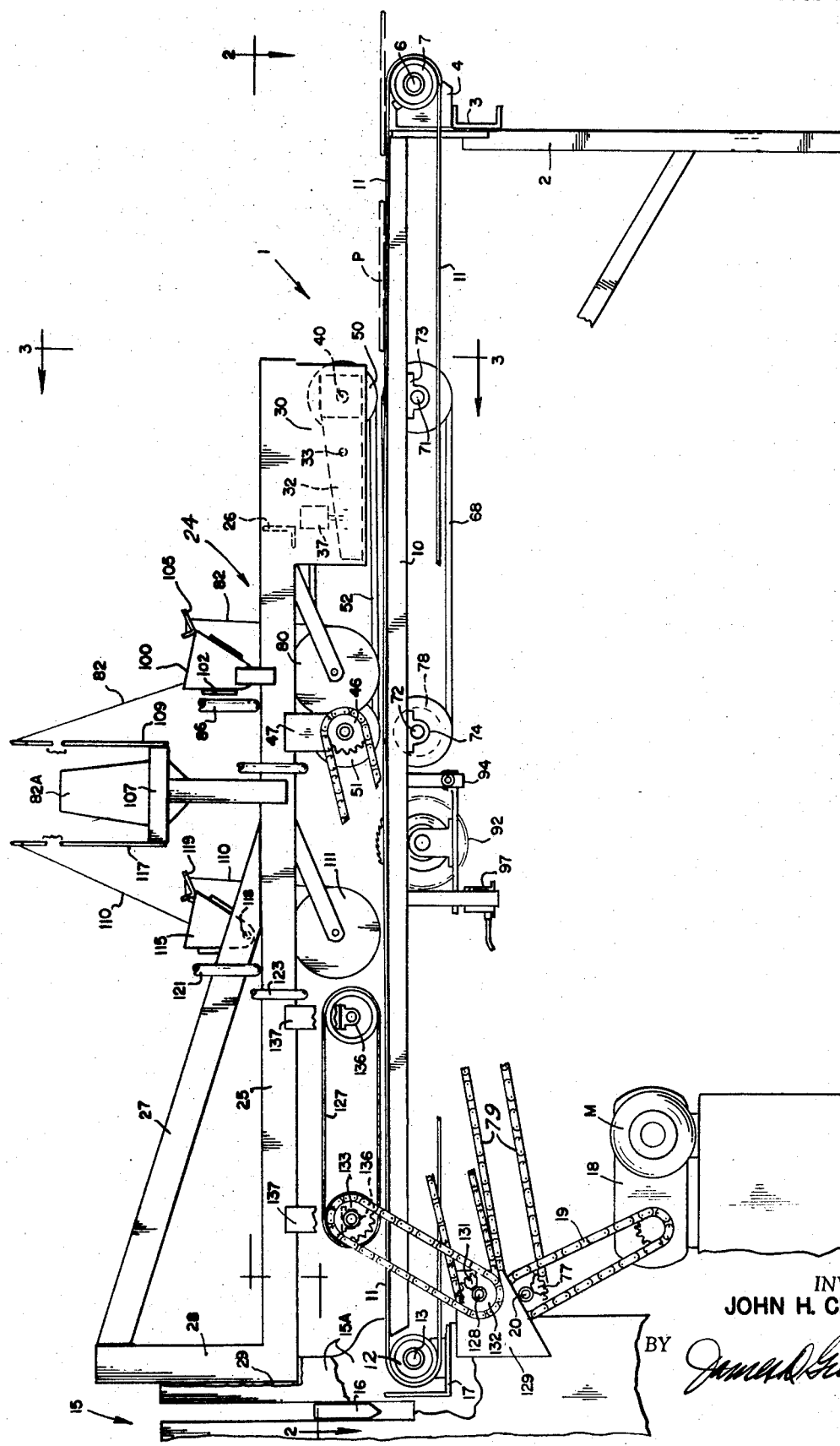
FIG. 1 is a side elevational view of a machine embodying the present invention.

FIG. 3 is a sectional, elevational view of the forward part of the machine taken along line 3—3 of FIG. 1, FIG. 4 is a sectional, elevational view of the machine taken along irregular line 4—4 of FIG. 2, FIG. 5 is a sectional, elevational view taken along line 5—5 of FIG. 2 and showing in a typical manner upper and lower crowder belts in relationship to a main transfer belt, and FIG. 6 is a plan view of core material produced by the machine and cut in an exemplary manner.

DESCRIPTION OF THE PREFERRED EMBODIMENTS

With continuing reference to the drawings wherein reference numerals identify parts similarly identified in the following specification, the reference numeral 1 indicates generally a table-like structure having supporting legs 2 at its forward end and an upper framework as later described.

With attention to FIGS. 1, 2 and 4, extending crosswise of the structure interconnecting the legs 2 is a channel beam 3 which further serves as a support for spaced apart plates 4 on which bearings 5 are mounted. A shaft 6 is journalled in said bearings and carries a plurality of belt pulleys 7 spaced therealong. Also supported by channel beam 3 are brackets as at 8 which in turn support belt ways 10 extending the length of the table and on which endless belts 11 travel in a horizontal plane.

At the rearward end of the table-like structure 1 are a series of cooperating pulleys 12 for the belts 11 carried by a rear pulley shaft 13. In the present embodiment of the invention it has been found convenient to journal the shaft 13 in bearings as at 14 mounted on a veneer clipper machine generally at 15, such a machine being well known to those skilled in the present art and conventionally including a transversely disposed blade 16 intermittently actuated for cutting panels at settable lengths. The panels pass intermediate the two end members 15A of the clipper. The association of the rear bearings 14 with the clipper 15 is as aforesaid a matter of convenience only since it will be apparent that the bearings could be supported in a manner similar to the forward bearings 6 with the clipper machine being structurally disassociated. In the arrangement shown brackets 17 are affixed to the clipper spaced across the width thereof to mount the bearings 14.

The rear shaft 13 is powered by a motor M, a driving connection including a speed reduction unit 18, chain drive 19, a transversely extending shaft 20 and a second chain drive 21 (FIG. 2). The reduction unit may conventionally include means variable for precisely setting the output speed.

The endles belts 11 are driven in a continuous manner to deliver the interconnected core material to the clipper, the blade of which is intermittently actuated in by timed or mechanical switch means (not shown) to sever the continuous veneer core material formed by the present invention into selected lengths which, for example, may be eight feet for later lay-up into four by eight foot plywood sheets.

With attention to the upper part of the machine embodying the present invention an upper framework is indicated generally at 24 vertically spaced in a fixed manner above table-like structure 1. The framework comprises a pair of channel sidemembers 25 located above and slightly outward of the outermost belts 11. Crossmembers as at 26 join the sidemembers therealong while diagonal members 27 further brace the same.

The framework 24 is conveniently mounted upon the clipper 15 by means of vertical members 28 being secured as by welds 29 to each of the clipper's end members 15A. For rigidity internal bracing of the framework includes diagonal cross-members, not shown.

CROWDER ASSEMBLY

Adjacent the forward ends of each sidemember 25 are vertical side plates 30 secured thereto as by welding. Rockably mounted on each side plate by means of a pivot pin 33 is a carrier 32 of a crowder assembly as typically shown in FIG. 4. Secured to one end of each of the carriers 32 is a self-aligning, flanged bearing 34 of the type permitting axial misalignment of a shaft end journalled therein. Oppositely disposed from the bearing 34 on each carrier is tab 36 against which the piston rods of single acting air cylinders 37 and 38 bear. Accordingly, upon pressurization of one of the cylinders its piston rod is extended to rock the carrier about pin 33, causing the bearing 34 to be upwardly displaced. Carrier limit stops are indicated at 39.

Journalled at its ends within the bearings 34 is a first crowder shaft 40 which is further journalled in a centrally located and self-aligning bearing 41 shown in FIG. 3. The bearing 41 is mounted on a carrier at 42 which also is capable of rocking movement by reason of being pivotally mounted at 43 on a plate member 44 depending from crossmember 26 of the framework 24. The forward end of the carrier 42 is suspended at 48 in a manner to permit limited vertical movement of the self-aligning bearing 41. An air cylinder 49, in circuit with a source of air pressure through an operator controlled valve (not shown), may be activated to raise bearing 41 as later described in conjuction with the handling of panels of lesser length.

As viewed in FIG. 3 it will be apparent that upon pressurization of a cylinder 38 on the right hand side the axis of the first crowder shaft 40 will be moved to an inclined position (raised segment of shaft shown in broken lines) as indicated at X. Independent activation of the other or left hand side cylinder 37 would tilt the axis X of crowder shaft 40 a similar distance, a half inch or so, but of course in an opposite direction. The purpose in tiltably mounting the shaft 40 will be hereinafter made clear.

A second crowder shaft at 45 is located rearwardly of the first shaft and is rotatably mounted on a fixed axis in bearings, not shown, which are suspended by hangers as at 47 (FIG. 1) from the framework sidemembers 25. Shaft 45 extends outwardly past one of said bearings to receive a sprocket 46. Secured at spaced intervals along both crowder shafts 40 and 45 are cooperating pulleys at 50 and 51 carrying upper crowder belts 52 as typically shown in FIG. 5.

Located above and along the lower run of each of the belts 52 is a backing bar 55 (typically shown in FIG. 5) suspended so as to present its lower surface in substantially coplanar relationship with the inner surface 52A of the belt. The opposite panel contacting surface of the belt is accordingly positively positioned as it traverses the belts lower run. The bars 55 are suspended from laterally spaced rectangular frames 56 and 57 of bolted angle iron construction as shown in FIG. 2 with said frames both being independently supported upon the first and second crowder shafts 40 and 45. Mounting the front of frame 56 on the first crowder shaft 40 are self-aligning bearings as at 58 and 59 while the forward end of frame 57 is supported in like bearings at 60 and 61. The rearward end of frame 56 is supported by bearings 62–63 carried by the second or rear crowder shaft 45 and the rearward end of frame 57 is likewise supported on the shaft 45 by bearings 64–65.

To permit inclining of the axis of the first crowder shaft as previously described the forwardly located bearings 58 through 61 are self-aligning thus allowing the axial relationship of shaft to bearing to be variable within the extent required. As shown in FIG. 5 which is typical of either end of the first crowder shaft the pulley 50 adjacent the end and the other pulleys 50 to a lesser extent are raised as the shaft 45 is lifted at one end or the other out of its normal horizontal position by activation of one or the other air cylinders 37–38 which in effect warps slightly frames 56–57. Inclining of the shaft 40 is for the purpose of lifting some of the crowder belts 52 progressively upward along the shaft away from a veneer panel. With reference to FIG. 2 for example, if air cylinder 38 were activated resulting in the lifting of the adjacent end of shaft 40 it will be apparent that the outer end of a veneer panel P passing therebeneath would be slowed in comparison with its opposite end whereat belt 52 is in full contact with the panel's end. From this it will be seen that a machine operator by manipulating a suitable valve, each in a circuit with cylinder 37 and cylinder 38, by selectively pressurizing either cylinder may advance a trailing end of a misaligned veneer panel so as to bring the panel into desired right angular relationshp with the machine's centerline.

In operation, the crowder belts accelerate each panel into abutting edge contact with the preceding panel for subsequent application of a continuous element. Misalignment of the panels to a great extent is automatically remedied by the crowder belt action. Actuation of one or the other of air cylinders 37–38 for progressively lifting the crowder belts 52 is only necessary when a veneer panel is severely misaligned. Accordingly, if the veneer panels were always precisely deposited on the belts 11 with their spaced apart edges in substantial parallel relationship the air cylinders 37–38 could be dispensed with resulting in the shaft 40 rotating about a fixed axis.

Lower crowder belts 68 of the crowder assembly cooperate with each of the upper belts 52. As typically shown ing FIG. 5, pulleys at 69 and 70 the belts 68 are carried by front and rear shafts 71 and 72 which are journalled in pairs of bearings 73 and 74. The bearings 73 and 74 are fixed to the underside of the outermost ways 10. The rear shaft 72 is in driven connection with shaft 20 by a chain 79 and sprockets 77 and 78 in FIG. 1.

As further typically shown in FIG. 5, the opposing belt surfaces of belts 52 and 68 are slightly elevated from the horizontal plane in which the main belts 11 travel. A veneer panel being conveyed by the belts 11 upon encountering the crowder belts 52–68 is lifted from the belts 11 and accelerated by the faster moving crowder belts into edge abutment with the preceding panel. As previously pointed out the crowder belt arrangement will reposition misaligned panels automatically and only in severe cases of panel misalignment will the activation of air cylinder 37 or 38 be required.

The foregoing structure accomplishes the presentation of veneer panels in consecutive and edge abutting relationship to a first series of wheels 80 spaced across the width of the present machine. Each wheel 80 is swingably mounted by arms 81 pivotally attached to one crossmember 26 of the upper framework 24. The wheels 80 rest on the contiguous panels to apply a continuous element 82 to which element has been previously applied an adhesive. The element 82 may be string of natural or synthetic material coated with molten glue. Each wheel 80 weighs approximately thirty-five pounds and is disposed over one of the belts 11 to bias the element into glued contact with the veneer panel passing therebelow on said belts.

It will be noted with reference to FIG. 5 that where the contacting periphery of a representative wheel engages the panel the lower crowder belts 68 and the main belts 11 are coplanar thus the panel in the crowding operation has descended slightly back to the plane of the belts 11.

The wheels 80 are rotated as the veneer panel passes to consequently draw the continuous elements 82 from a supply indicated at 82A. Moisture is applied to the wheel's circumferential wall by an applicator 83 retained in bracket 84 carried by its arms 81 which bracket also mounts a wiper 85 of flexible material. The moisture on the wheel in combination with the wiper serves to prevent the continuous element 82 from adhering to the wheel. A water pipe 86 extends across the upper framework 24 and is provided with adjustable outlets 87 for supplying water to the applicators 83.

Rearwardly located from each wheel 80 is an air nozzle 90 supplied by a common air line 91 and directing a continuous airflow to the newy applied continuous element to dry its adhesive coating. To deter collecting of glue by the wheel it has been found advantageous to provide a highly finished surface thereon or alternatively plating of the wheel with a chromium finish.

Upon passage rearwardly from the wheels 80 the originally separate veneer panels are now interconnected or joined in abutting relationship by the adhering continuous elements 82 and thus form continuous core material which is subsequently cut into desired lengths by the clipper 15 to produce one-piece core for later lay-up with other such cores into a plywood panel.

As shown in FIGS. 1 and 4, a rip saw 92 may be provided medially of the table-like structure 1 for ripping the one piece core into a desired width. For example, the structure 1 may be of a width to receive crosswise eight foot lengths of veneer panels to produce continuous one-piece core material of like width. The saw 92 is encountered by the one-piece core and thereby ripped into two four foot widths which are later clipped into eight foot long core lengths.

To permit selective use of saw motor 92 a U-shaped bracket 94 is secured to depend from the centrally located ways 10 upon which bracket a saw motor platform 95 is hingedly attached at 96. An air cylinder 97 is suspended by a pair of arms 98 beneath the platform 95 for raising a saw motor 93 and saw 92. Obviously a mechanical linkage also controlled by the machine operator may be utilized to raise the saw assembly into a cutting position.

A glue trough 100 is mounted crosswise of the framework 24 as best shown in FIG. 3 by means of supports 101 welded to side members 25 of the framework. Coextensive with the trough are elongate heating elements 102–103 heating the trough to a temperature to permit solidified glue blocks to be melted therein. A supply of glue 104 is conveniently provided by the periodic placement of glue blocks in the trough 100. Affixed along the forward lip of the trough are a series of guides 105 each generally in shape of a Y with grooved portions in each arm of the Y through which a rim of the continuous element 82 passes.

A supply of the element 82 for each wheel 80 is indicated at 82A stored on a raised platform 107 from which the element is drawn upwardly past a standard 109 from whence it passes downwardly beneath a submerged rod 108 extending adjacent the trough's bottom. The continuous element 82 is accordingly submerged in the glue supply as it is pulled by its wheel 80 and a traveling panel with the arms of Y-shaped guide 105 serving to removed and return to the trough any excess adhesive.

Referring to FIG. 6, a pattern of continuous elements 82 is shown applied to one-piece core material comprised of several interconnected veneer panels P. The core may be cut as shown in a broken line by saw 93 and clipped as shown in dashed lines by the clipper 15 to provide one-piece cores of desired dimensions with the continuous elements 82 functioning to retain the veneer panels together.

Additional continuous elements at 110 are applied to the core stock by a second series of wheels at 111 in FIG. 4. The wheels 111 are carried by arms 112 attached to a crossmember 26, said wheels being provided with brackets 113 housing applicators 114 and having a wiper 115 secured thereto. The foregoing structure of the second series of wheeels 111 is identical with the wheel 80 and its associated parts.

A second glue trough at 115 carries a supply of glue through which the additional continuous elements are drawn from a supply at 116 on the platform 107. The elements 115 pass upwardly through standards 117 thence downwardly under a submerged rod 118, over a Y-shaped guide 119 and downwardly to the elements respective wheel 111. The parts associated with trough 115 are identical to those first described.

The additional elements 110 serve to reinforce the first applied elements. Further, in cases where the belts 11 are momentarily stopped for various reasons the continuous elements 82 and 110 will also stop resulting in the glue thereon to be dried prior to restart of the machine belts 11. By applying the elements 82 and 110 at spaced intervals any dried segments of the first element not adhering to the veneer panels will have no serious effect since a parallel segment of the second element 110 will be applied to the panel or panels in a wet state. This is accomplished by spacing the rear series of wheels 111 rearwardly from the first series a distance no less than the length of a glue carrying segment of element 82 which is susceptible to drying.

A water supply for each applicator 114 is provided by a pipe 121 having valve fitted outlets 122 located above each applicator. An air line 123 extends crosswise of the machine and is provided with nozzles 124 to direct an airflow against the additional continuous elements 110 to dry same all in a like manner to that first described.

Driven belts 127 entrained on pairs of pulleys 126, as best shown in FIGS. 2 and 4, are located above the belts 11 and serve both to keep the interconnected panels flat upon the belts 11 preventing buckling and to further aid in conveying them toward the clipper 15. To accomplish powering of the belts 127 a jack shaft 128 rotatably mounted on plate 129 is in gear driven engagement with shaft 20. A pair of sprockets 131 and 132 are carried by the jack shaft with the former sprocket being in driving connection with sprocket 46 of the crowder shaft 45.

Sprocket 132 is in driving connection with a sprocket 133 carried at one end of a shaft 134 to drive the same for operation of the belts 127. The shaft 134 and its companion shaft at 135 are journalled in bearing 136 mounted on hangers 137 depending from each channel shaped sidemember 25.

The interconnected core material is continuously advanced into the clipper 15 which, as aforementioned, may conventionally include automatic means for actuating the clipper blade to sever the joined veneer panels at predetermined lengths. As shown in FIG. 6 the interconnected panels may be originally of eight foot widths for cutting by the saw 93 and clipper 15 into four feet by eight feet one-piece cores, of which four are shown.

While the clipper 15 is incorporated structurally with the present invention it may be desirable in some plant operations to locate the clipper remote from the machine embodying the present invention, in which case leg members may be utilized to support the components presently shown mounted on the clipper for convenience sake.

For the running of very thin veneer panels through the present machine it may be desirable to install hold down belts rearward of the first series of wheels 80 to prevent upward heaving of the interconnected core material.

The machine disclosed embodying the present invention is adapatable to interconnecting panels having a length equal to approximately half the width of the machine as viewed in FIG. 2. In this use the pressurization of cylinder 49 will act to raise the centrally located belt 52 away from the end surface of the shorter veneer panel resulting in that end being slowed in relation to its opposite end for crosswise positioning purposes. In normal operation wherein veneer panels of a length nearly equal to the machine's width are being handled the piston rod 49A of cyclinder 49 will be free floating since only cylinders 37–38 will be alternately used.

The operation of the present invention is believed apparent from the foregoing description in which for sake of clarity the operation of associated components has been given in conjunction with their description.

I claim:

1. A machine for applying continuous elements to moving panels to interconnect the same,
    a base structure provided with endless conveyor belts for transfer of the panels disposed crosswise thereon,
    a crowder assembly located along said conveyor belts and including endless crowder belts disposed both above and substantially below said conveyor belts, said crowder belts having vertically spaced apart opposed runs for panel reception therebetween, said runs being driven at a speed in excess of the speed of said conveyor belts for accelerating an elevated panel therebetween into edge abutment with a previous panel, backing plates for said crowder belts to retain a desired spaced relationship between said runs,
    continuous elements adapted for parallel application to consecutive abutting panels,
    a trough for retention of a supply of molten glue and including means for heating the glue, guides for said continuous elements to direct same into and out of the molten glue,
    wheel means of a weight to bias each of said glue bearing continuous elements into consecutive contact with said abutting panels to interconnect the same, said wheel means including a moisture applicator in contact with the wheel's periphery, and
    airflow means located above said panels and directing an airflow against the interconnected panels to dry the continuous elements adhering thereto.

2. The machine as claimed in claim 1 wherein said upper crowder belts are carried by cooperating pulleys mounted on first and second shafts with said shafts in crosswise normally horizontal relationship to said base structure, means mounting said first shaft permitting upward inclination of the shaft's axis out of said horizontal relationship thereby reducing the driving contact of said belts carried by the inclined first shaft to slow one end of a veneer panel subjacent the inclined end of said first shaft while the panel's opposite end is advanced to orientate the panel's leading edge into parallel relationship to the trailing edge of a preceding panel.

3. The machine as claimed in claim 1 wherein said wheel means are arranged in a first and second series with each of said series having a plurality of wheels in resting rolling contact with passing veneer panels and spaced thereacross, said second series of wheels being spaced rearwardly a distance from said first series to insure the application to the panels of an undried continuous element segment adjacent those dried element segments applied by the first series of wheels such drying occurring during momentary stoppage of the machine.

4. A machine for applying continuous elements to wood veneer panels to interconnect the same for use as core material in plywood sheets, said machine comprising,
    a base structure including conveyor means for the transfer of the panels,
    a crowder assembly located along said conveyor means for advancement of each panel into edge abutment with an adjacent panel, said crowder assembly including endless crowder belts disposed both above and substantially below the conveyor means and having spaced apart opposed runs for panel reception, said runs being driven at a speed differing from the speed of said conveyor means for changing the speed of a panel causing it to come into abutment with an adjacent panel prior to the application of said continuous elements, said upper crowder belts carried by cooperating pulleys mounted on first and second shafts with said shafts in crosswise normally horizontal relationship to said base structure, means mounting said first shaft for selectively inclining the axis of the first shaft out of the horizontal whereby the panel contacting surface area of a raised upper belt will be reduced to lessen the effect of said upper belt on the veneer panel whereby one end of a panel moving along the conveyor means may be repositioned while thereon to accomplish edge abutment with an adjacent panel,
    continuous elements bearing molten glue adapted for parallel application to abutting panels, and
    means engaging said continuous elements and biasing said elements into pressured adhering contact with the abutting panels to interconnect the same.

5. The machine as claimed in claim 4 wherein said first shaft mounting means includes operator controlled pressure responsive means located adjacent the opposite ends of said shaft for inclining same in either direction.

6. A machine for applying continuous elements to wood veneer panels to interconnect the same for use as core material in plywood sheets, said machine comprising,
    a base structure including conveyor means for transfer of the panels,
    a crowder assembly located along said conveyor means for advancement of each panel into edge abutment with an adjacent panel,
    continuous elements bearing molten glue adapted for parallel application to abutting panels, and
    first and second series of wheels engaging said continuous elements and biasing same into pressured adhering contact with the abutting veneer panels to interconnect the same, said second series of wheels horizontally spaced from the first series in the direction of travel of the panels and applying continuous elements in parallel to those elements earlier applied by said first series of wheels to reinforce the last mentioned elements and to insure the application of continuous elements bearing molten glue to the panels in the event of machine stoppage during which time the glue carried by the earlier applied elements may have dried.

7. The machine as claimed in claim 6 wherein a moisture applicator is in contact with the periphery of each of said wheels.

8. The machine as claimed in claim 7 additionally including air nozzles located rearwardly of each wheel and directing a drying air flow against the continuous elements adhering to the panels.

References Cited

UNITED STATES PATENTS

| | | | |
|---|---|---|---|
| 1,137,243 | 4/1915 | Terry | 156—545X |
| 2,488,759 | 11/1949 | Bolling | 156—558 |
| 3,155,558 | 11/1964 | Clapp | 156—558X |

SAMUEL FEINBERG, Primary Examiner

J. M. HANLEY, Assistant Examiner

U.S. Cl. X.R.

156—304, 297, 559